United States Patent [19]
Edwards

[11] 3,750,980
[45] Aug. 7, 1973

[54] AIRCRAFT WITH VERTICAL TAKE OFF AND LANDING CAPABILITY

[76] Inventor: Samuel L. Edwards, 212 Prince St., Newark, N.J. 07102

[22] Filed: June 30, 1970

[21] Appl. No.: 51,161

[52] U.S. Cl. ............................................. 244/12 C
[51] Int. Cl. ........................ B64c 17/02, B64c 29/00
[58] Field of Search ............... 244/12, 23, 93, 12 R, 244/12 C, 12 D, 36, 40, 1 R, 1 SS, 1 SA, 1 SB, 6, 7 R, 7 A, 73, 74

[56] References Cited
UNITED STATES PATENTS

| | | | |
|---|---|---|---|
| 3,632,065 | 1/1972 | Rosta | 244/12 C |
| 3,335,976 | 8/1967 | Kappus | 244/23 B X |
| 3,123,320 | 3/1964 | Slaughter | 244/12 C |
| 3,067,967 | 12/1962 | Barr | 244/12 C |
| 2,777,649 | 1/1957 | Williams | 244/23 C |
| 3,507,461 | 4/1970 | Rosta | 244/12 C |
| 3,437,290 | 4/1969 | Norman | 244/23 C |
| 3,432,120 | 3/1969 | Guerrero | 244/93 |

Primary Examiner—Duane A. Reger
Assistant Examiner—Carl A. Rutledge
Attorney—Popper, Bain, Bobis and Gilfillan

[57] ABSTRACT

An aircraft with vertical landing and take off capability comprising a stator having a housing for control means as well as a cockpit for operational personnel and a turbine like rotor driven by reaction jets mounted on the stator, the turbine rotor having an air inlet on the upper surface of the stator and an air outlet on the bottom of the stator with means for directionally deflecting the air outlet for control purposes; the stator also including weight means mounted along the vertical axis of the stator and displaceable radially from the vertical axis.

6 Claims, 3 Drawing Figures

PATENTED AUG 7 1973

3,750,980

INVENTOR.
SAMUEL L. EDWARDS
BY
Popper, Bain, Bobis & Gilfillon
ATTORNEYS 3,750,980

AIRCRAFT WITH VERTICAL TAKE OFF AND LANDING CAPABILITY

BACKGROUND OF INVENTION

Many vertical take off and landing aircrafts are known. Some are in the nature of helicopters characterized by at least one horizontally rotatable blade for the forcing of air downwardly to overcome the drag of gravity. Others are of the fixed wing variety having propulsion means, either propellers driven by conventional internal combustion engines or turbines or jet engines which engines are rotatable either independently of or simultaneously with the fixed wing. In still other fixed wing aircraft, the jet stream generated by a jet engine is deflectable downwardly to overcome the drag of gravity.

In all vertical take off and landing aircraft, control, particularly at sub-flight speeds for fixed wing aircraft is extremely critical and in many instances dangerously unstable. In addition, the aerodynamic structural characteristics of a vertical take off and landing aircraft are not consonant with high speed fixed wing aerodynamic demands.

It is among the objects and advantages of the present invention to provide a totally aerodynamically stable aircraft which has vertical take off and landing capabilities as well as high speed, aerodynamically stable straight flight capabilities.

Another object of the present invention is to provide an aircraft as aforesaid in which propulsion is generated by an annular, rotatable turbine capable of forcing very large quantities of air at relatively high velocities vertically downwardly with respect to the vertical axis of the aircraft.

A further object of the present invention is to provide an aircraft as aforesaid in which the turbine or rotor is driven by jet or rocket propulsion means.

Yet a further object of the present invention is to provide an aircraft as aforesaid in which control may be achieved by either deflecting the outlet air pass from the turbine or upsetting the vertical balance of the aircraft by weight displacement or a combination of the two.

SUMMARY OF INVENTION

An aircraft having vertical take off and landing capabilities comprising, a stator, an annular, rotatable turbine mounted within the stator generally coaxial therewith, reaction jet means mounted on the stator, the reaction jet from said means impinging upon the turbine to generate rotation, the stator having an air inlet opening above the turbine and an air outlet opening beneath the turbine, air deflection means in the air outlet opening, and rotational reaction-countering means on the stator positioned to balance the rotational reactive forces of the jet blast means and the turbine.

PREFERRED EMBODIMENT OF INVENTION

The objects and advantages aforesaid as well as other objects and advantages may be achieved by the aircraft claimed herein a preferred embodiment of which is illustrated in the drawings in which:

Figure 1:
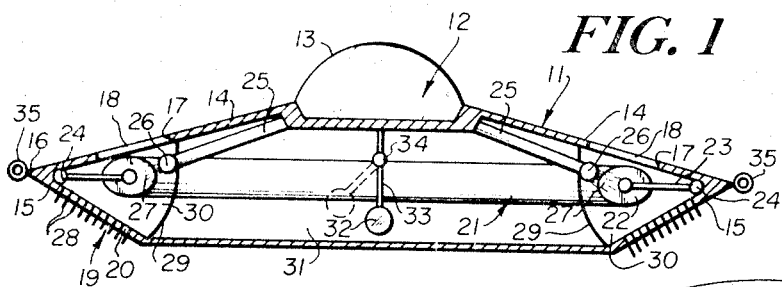
FIG. 1 is a side elevational cross sectional view of the aircraft.
Figure 2:
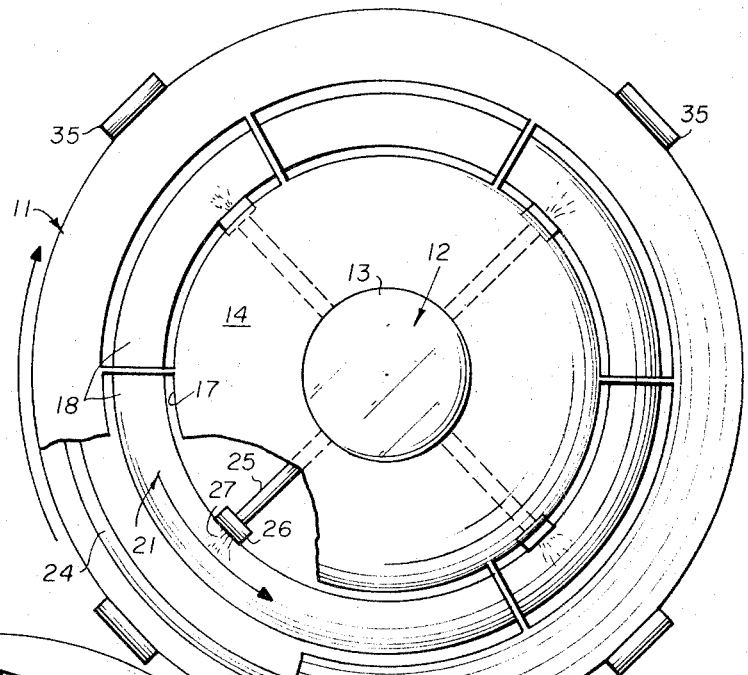
FIG. 2 is a partially broken away top plan view of the aircraft.
Figure 3:
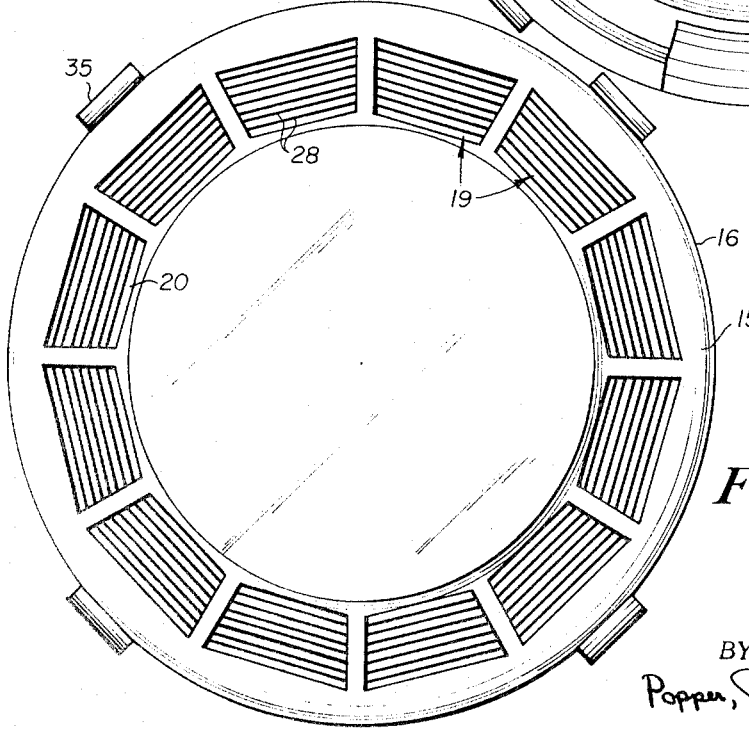
FIG. 3 is a bottom plan view of the aircraft.

Referring now to the drawings in detail, the aircraft comprises a stator 11 which is broadly disc-shaped having a circular peripheral configuration. The stator 11 includes a cockpit 12 covered by a transparent cowling 13. The stator 11 which is analogous to the fuselage of a thick wing aircraft comprises a generally outwardly and downwardly incline annular top wall 14 and an annular inwardly and downwardly inclined bottom wall 15. The top and bottom walls 14 and 15 are formed upon or engaged to each other at a periphery 16.

The top wall 14 is provided with openings 17 spaced around the periphery of the aircraft and near the juncture between the top wall 14 and bottom wall 15. Preferably, the opening 17 is continuous around the periphery of the wall 14 save for radial structural members 18 which extend across the annular opening 17.

Similarly, the bottom wall 15 is provided with an opening 19. The opening 19 is similar to the opening 17 in that it preferably extends annularly around the general periphery of the aircraft interrupted only by structural members 20. An annular turbine 21 is mounted within the stator 11 with the turbine blades 22 positioned generally between openings 17 and 19. The turbine 21 is provided with a mounting rib 23 which extends radially outwardly to the juncture between the top wall 14 and bottom wall 15 of the stator 11. A bearing 24 at the radially outward end of the rib 23 provides a low friction mounting between the rotatable turbine 21 and the stator 11.

The stator 11 is provided with a plurality of radial arms 25 extending outwardly from the cockpit 12 and terminating inwardly of the turbine 21. Each of the arms 25 is provided with jet blast generating means 26 on its radially outward end. The jet blast 27 is directed at the upper portion of the turbine 21 in such a manner as to induce and generate rotation in the turbine.

Opening 18 in the top wall 14 of the stator 11 functions as an air inlet for the turbine 21. Similarly, opening 19 in the bottom wall 15 of the stator 11 functions as an air outlet for the turbine 21. Air is sucked inwardly through the air inlet opening 17 by means of rapid rotation of the turbine 21 generated by the jet blast means 26 and forced outwardly under high velocity through the air outlet opening 19. The air outlet opening 19 is provided with air deflection vanes 28 which are movable in response to controls in the cockpit 12.

The stator is also provided with an internal wall 29 isolating the turbine chamber 30 from the remainder of the stator 11. The wall 29 also defines a second chamber 31 in the stator 11 which may be closed at the bottom or open as desired. The chamber 31 can provide additional carrying space for the aircraft.

In operation, the jet means 26 which may be rocket or conventional turbine jets are energized so that the jet blast 27 engages the turbine blades 22 of the turbine 21. The turbine 21 rapidly rotates drawing air in through the air inlet 17 and forcing it out under high velocity through the air outlet 19. In order to control the direction of air passing through the outlet 19, the vanes 28 may be moved selectively at various positions on the stator 11. Thus, most of the air can be forced downwardly to overcome gravity lifting the vehicle vertically upwardly. When translation of movement is desired, some of the vanes 28 may be oriented to deflect the air more radially outwardly thereby creating a horizontal vector. In addition, if all of the vanes 28 are positioned to deflect the air radially outwardly on a symmetrical basis the vertical vector of lift will be decreased without generating an unbalanced horizontal vector.

Another means of control is also illustrated in the drawings and comprises a weight 32 mounted on a shaft 33 on the vertical axis of the stator 11. A universal joint 34 controlled from within cockpit 12 can displace the weight 32 from the vertical axis of the stator 11 as illustrated in broken lines in FIG. 1. Displacement of the weight 32 causes the stator 11 to rotate around a horizontal axis of choice depending upon the radial position of weight. This in turn causes the stator 11 to tip generating force vector for translational flight.

The jet blast means 26 employed to generate rotation in the turbine 21 also generate rotational reaction forces in the stator 11. These rotational reactive forces must be overcome otherwise the stator would tend to rotate in a direction opposite from that of the turbine 21. In order to overcome these rotational reactive forces, a plurality of counterbalancing jets 35 are mounted on the periphery of the stator 11. The jets 35 generate a counterbalancing force to the jets 26. In addition, the vanes 28 could be rotationally deflected to provide some counter rotational forces to overcome the reactive rotational forces generated by the jets 26.

The foregoing description is merely intended to ilustrate an embodiment of the invention. The component parts have been shown and described. They each may have substitutes which may perform a substantially similar function; such substitutes may be known as proper substitutes for the said components and may have actually been known or invented before the present invention.

What is claimed is:

1. An aircraft having vertical takeoff and landing capabilities comprising,
    a. a generally hollow housing,
    b. an annular turbine mounted for rotation within the housing,
    c. fixed reaction jet means mounted within the housing to impinge said jet upon the turbine,
    d. the housing having upper air inlet opening means immediately above the turbine and lower air outlet opening means immediately beneath the turbine,
    e. the jet means generating sufficient rotation of the turbine to induce a lift-producing flow of air downwardly through the upper air inlet opening means and outwardly through the lower air outlet opening means, exhaust from the jet means passing downwardly and outwardly through the lower air outlet opening means,
    f. air deflection means in the lower air outlet opening means, and
    g. rotational reaction-countering means on the housing positioned to balance the rotational reactive forces of the said fixed reaction jet means and the tubine.

2. An aircraft having vertical take-off and landing capabilities comprising,
    a. the structure in accordance with claim 1 in which,
    b. said air deflection means being adjustably movable to deflect the said stream of air eminating from the lower outlet opening means sufficient to counter rotatable reaction induced in the housing from said jet means and turbine.

3. An aircraft having vertical takeoff and landing capabilities comprising,
    a. the structure in accordance with claim 1 and
    b. means for moving the center of gravity of the aircraft radially with respect to the turbine including weight means mounted on a vertical shaft extending through the nominal center of gravity of the aircraft, said weight means being movable both in vertical and horizontal planes.

4. An aircraft having vertical take-off and landing capabilities comprising,
    a. the structure in accordance with claim 1, and
    b. a conduit in the housing, the conduit extending between the said upper air inlet opening means and lower air outlet opening means,
    c. the turbine lying within the conduit intermediate the opening means.

5. An aircraft having vertical takeoff and landing capabilities comprising,
    a. the structure in accordance with claim 2 and
    b. means for moving the center of gravity of the aircraft radially with respect to the turbine including weight means mounted on a vertical shaft extending through the nominal center of gravity of the aircraft, said weight means being movable both in vertical and horizontal planes.

6. An aircraft having vertical takeoff and landing capabilities comprising,
    a. the structure in accordance with claim 5 in which
    b. a control means including universal mounting means for the said shaft movable simultaneously in vertical and horizontal planes.

* * * * *